(No Model.)
C. A. JOHNSON.
HUB ATTACHING DEVICE.
No. 355,398. Patented Jan. 4, 1887.
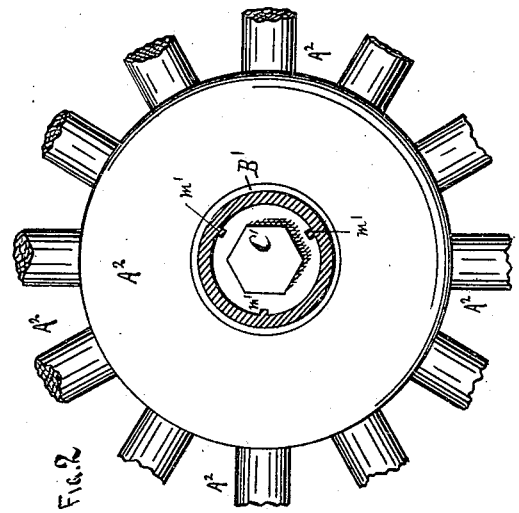
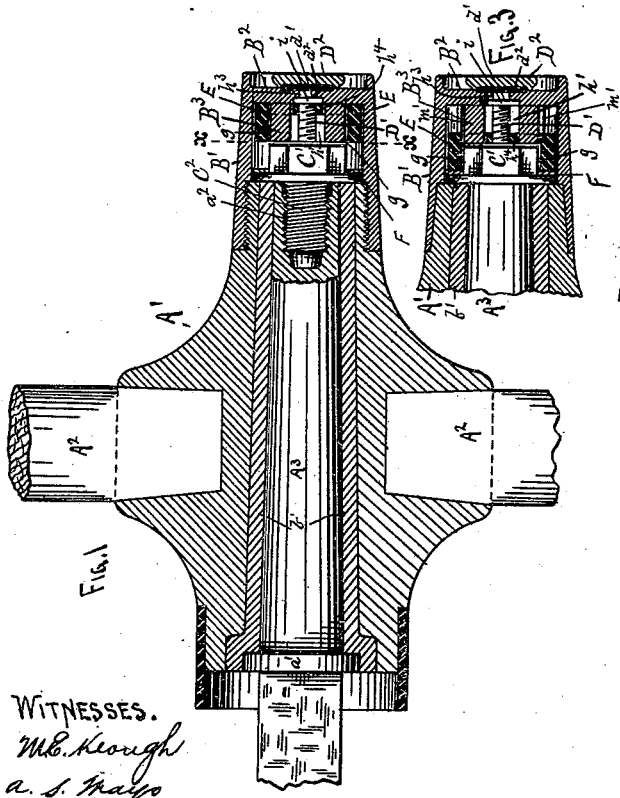
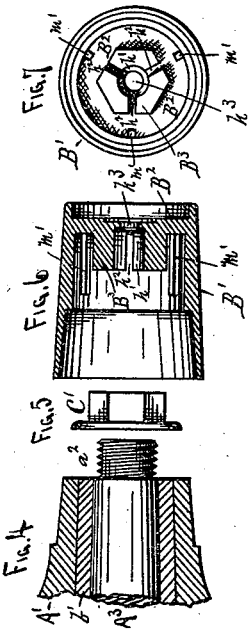
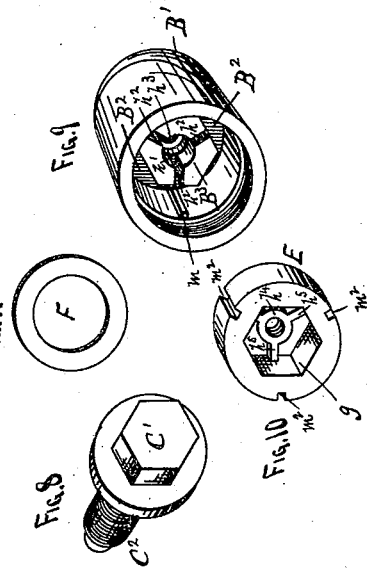
Charles Anthony Johnson,
INVENTOR, By
Charles N. Woodward,
Atty.
WITNESSES.
M. E. Keough
A. S. Mays

UNITED STATES PATENT OFFICE.

CHARLES ANTHONY JOHNSON, OF ST. PAUL, MINNESOTA.

HUB-ATTACHING DEVICE.

SPECIFICATION forming part of Letters Patent No. 355,398, dated January 4, 1887.

Application filed May 13, 1886. Serial No. 202,101. (No model.)

*To all whom it may concern:*

Be it known that I, CHARLES ANTHONY JOHNSON, a subject of the King of Norway and Sweden, who has declared his intention of becoming a citizen of the United States, and who resides at St. Paul, in the county of Ramsey and State of Minnesota, have invented certain new and useful Improvements in Vehicle-Hubs, of which the following is a specification.

This invention relates to vehicle-hubs; and it consists in the construction and arrangement of parts, as hereinafter shown and described.

In the drawings, Figure 1 is a sectional view through the hub of a wheel longitudinally, showing the locking-sleeve disconnected from the nut. Fig. 2 is a cross-section on the line $x\ x$ of Fig. 1. Fig. 3 is a sectional view of the outer portion of the hub and the ferrule and nut, showing the locking-sleeve engaged with the nut. Figs. 4, 5, and 6 represent different parts of the hub, axle, nut, and ferrule disconnected, the hub and ferrule being in section. Fig. 7 represents the ferrule from its inner or hub end. Figs. 8, 9, 10, and 11 represent the nut, ferrule, locking-sleeve, and stop-ring in perspective and disconnected.

A′ represents the main body portion of the hub, $A^2$ the spokes, and $A^3$ the axle, the latter having the usual collar, $a'$, and screw-thread $a^2$, while the hub is provided with the skein $b'$.

On the outer end of the hub A′ is a ferrule, B′, having a closed outer end, $B^2$, and secured to the hub by being screwed thereon, as in Fig. 1, or driven upon the hub, as in Fig. 3, or in any other suitable manner.

C′ is the nut by which the hub is secured to the axle $A^3$, and which may be provided with a stud, $C^2$, tapped into the end of the axle, as in Figs. 1 and 8, or adapted to fit over the ordinary screw-stud, $a^2$, on the end of the axle $A^3$, as in Figs. 3 and 4. Either method will accomplish the desired result, and are substantially the same.

The interior of the closed end $B^2$ of the ferrule B′ is provided with a projection, $B^3$, shown of the same shape and size as the head of the nut C′, although its shape and size may be different from the nut, as hereinafter explained.

In the drawings the nut C′ is of the ordinary six-sided pattern; hence the projection $B^3$ is of the same form; but if a square or other form of nut be used, then the projections $B^3$ will generally be made to conform therewith. This projection $B^3$, when the ferrule B′ is in place on the hub A′, as shown in Figs. 1 and 3, will almost touch the nut C′, and thus serve as a stop to the nut, as hereinafter shown. A circular cavity, $h'$, is formed in the center of the projection $B^3$, and radiating outward from this cavity are a number of channels, $h^2$, dividing the projection $B^3$ into a number of separate parts, as shown. In the drawings three of these radiating channels $h^2$ are formed; but any desired number may be used.

$h^3$ is a hole formed through the end $B^2$ of the ferrule B′ in the center of the cavity $h^2$, into which a screw-rod, D′, is journaled, as shown. This screw-rod is provided with a shoulder or collar, $i$, fitting into an annular cavity in the end $B^2$ around the hole $h^3$, and adapted to support the screw-rod from inside the ferrule, while a thumb-disk, $D^2$, is attached to the end of the screw-rod outside the ferrule. By this means the screw-rod is journaled in the ferrule and adapted to be revolved by the thumb-disk from outside the hub.

A ring of rubber or other suitable packing, $d'$, will be inserted between the shoulder $i$ and the metal of the ferrule end $B^2$, on the inside, and another similar ring, $d^2$, will be inserted between the thumb-disk $D^2$ and the metal of the end $B^2$ of the ferrule, on the outside, the two rubber rings effectually "packing" the joint between the ferrule and screw-rod D′, and preventing the leakage of oil from the axle-journal outward, or the entrance of sand or grit through the end of the ferrule inward.

E is a locking-sleeve provided with a central opening, $g$, adapted to fit over the nut C′ and projection $B^3$, as shown, and having a central hub, $h^4$, through which the screw-rod D′ is tapped, this hub being connected to the rim of the sleeve by radiating arms $h^5$, the hub $h^4$ adapted to fit into the central cavity, $h'$, and the arms $h^5$, adapted to fit into the radiating channels $h^2$ of the projection $B^3$. By this means, if the thumb-disk $D^2$ be turned in one direction, the sleeve E will be moved inward over the nut C′ and couple the nut to the ferrule and hub, so that if the wheel be revolved backward the nut will be turned backward and detached from the axle and permit the removal of the wheel, the nut remaining in the hub. Then when the wheel is to be replaced it is merely revolved forward until the nut is "home," and then the thumb-disk $D^2$ is revolved backward, which will draw the sleeve E outward off from the nut C', as shown in Fig. 1, leaving the hub free to revolve on the axle-journal $A^3$ without affecting the nut.

Inside the ferrule B' are a series of ribs, $m'$, adapted to fit into corresponding grooves, $m^2$, in the rim of the sleeve E, to serve as additional guides to the sleeve, and carry a portion of the strains and prevent it from being borne entirely by the projection $B^3$. These ribs may be formed in one piece with the ferrule, or in separate pieces and inserted into the ferrule; or the grooves $m^2$ may be formed in the ferrule and the ribs $m'$ formed on the sleeve. I have shown three of the ribs $m'$ and grooves $m^2$; but any number may be used.

A stop-ring, F, will be placed in the ferrule between the flange of the nut C' and the sleeve E, to limit the movement of the sleeve and prevent the arms $h^5$ from passing out of the channels $h^2$.

If preferred, a square or other irregular-shaped head adapted to be turned by a wrench may be substituted for the thumb-disk $D^2$, or a slit may be formed in the thumb-disk or in the end of the screw-rod D', to enable it to be turned by a screw-driver.

The projection $B^3$ serves the double purpose of a guide for the sleeve E and as a stop to prevent the nut from running back into the ferrule and sleeve. This projection $B^3$, as before mentioned, need not necessarily conform to the interior of the sleeve E, as the latter can be guided by the interior of the ferrule and the guides $m'$ and grooves $m^2$; but I prefer it formed as shown, as it strengthens the coupling and leaves smaller cavities for the accumulation of sediment or hardened oil, &c.

Having thus described my invention, what I claim as new is—

1. In a vehicle-wheel, the combination, with the axle-journal $A^3$, hub A', and nut C', of a ferrule, B', having closed outer end $B^2$ and inner projection, $B^3$, the latter adapted to form a stop to limit the movement of said nut, sleeve E, with its interior conforming to and adapted to fit over said nut and having central hub, $h^4$, and a screw-rod, D', journaled through said closed end $B^2$ and tapped through said hub, substantially as set forth.

2. In a vehicle-wheel, the combination, with the axle-journal $A^3$, hub A', and nut C', of a ferrule, B', having closed outer end, $B^2$, and inner projection, $B^3$, the latter adapted to form a stop to limit the movement of said nut, and with central cavity, $h'$, and radiating channels $h^2$, sleeve E, fitting over said projection, and with hub $h^4$ and arms $h^5$, fitting the cavity and channels in said projection, screw-rod D', journaled through the closed end $B^2$ of said ferrule and tapped through said hub $h^4$, ribs $m'$, and grooves $m^2$, uniting said ferrule and sleeve, substantially as set forth.

In testimony whereof I have hereunto set my hand in the presence of two subscribing witnesses.

CHARLES ANTHONY JOHNSON.

Witnesses:
C. N. WOODWARD,
F. O. RENART.